Aug. 2, 1932.  L. S. ROSENER  1,869,780
COUPLING
Filed Aug. 12, 1930
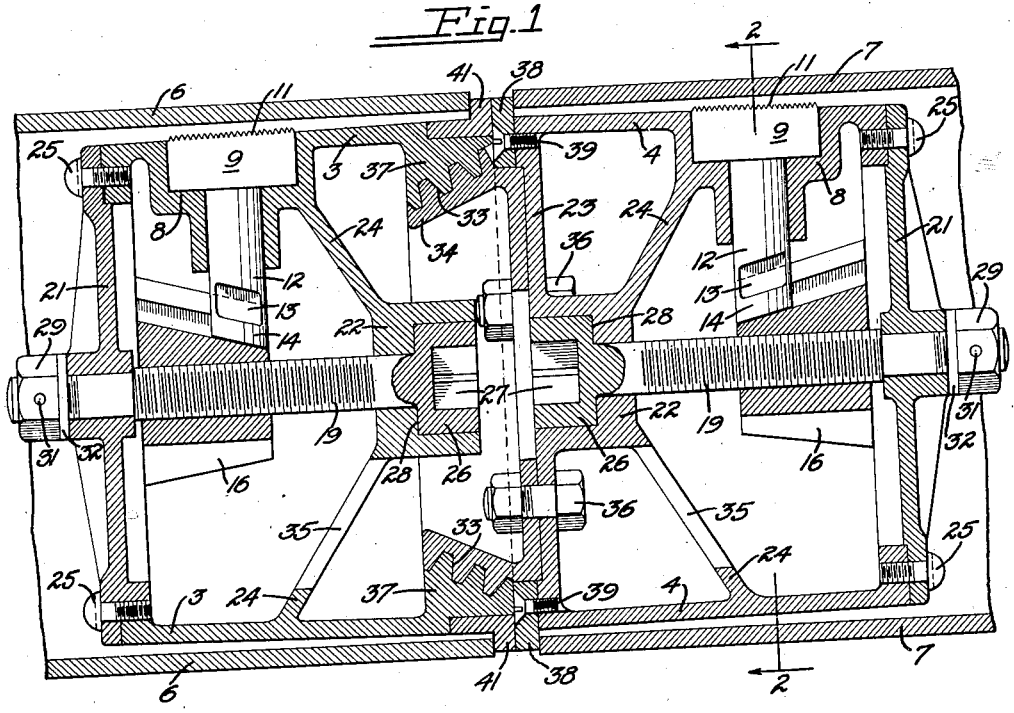
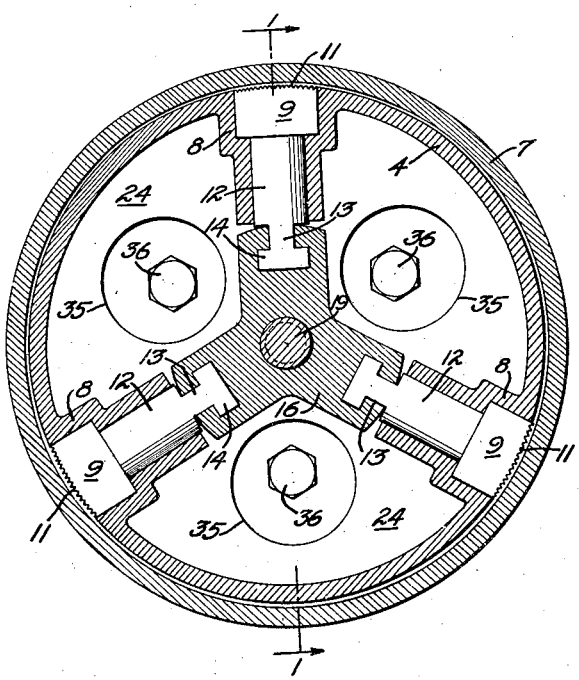
INVENTOR.
LELAND S. ROSENER.
BY Charles S. Evans
HIS ATTORNEY Patented Aug. 2, 1932

1,869,780

UNITED STATES PATENT OFFICE

LELAND S. ROSENER, OF SAN FRANCISCO, CALIFORNIA, ASSIGNOR TO THE PARAFFINE COMPANIES, INC., OF SAN FRANCISCO, CALIFORNIA, A CORPORATION OF DELAWARE

COUPLING

Application filed August 12, 1930. Serial No. 474,708.

My invention relates to a coupling, and particularly to a coupling for temporarily joining sections of pipe; as for example, while being wrapped with a protective strip.

It is among the objects of my invention to provide a pipe coupling which will obviate the necessity of stopping the pipe wrapping machine after each section of pipe is wrapped.

A further object of my invention includes the provision of positively controlled means for dogging the coupling to the pipe section.

The invention possesses numerous other objects and features of advantage, some of which, with the foregoing, will be set forth in the following description of my invention. It is to be understood that I do not limit myself to this disclosure of species of my invention, as I may adopt variant embodiments thereof within the scope of the claims.

Referring to the drawing:

Figure 1 is a longitudinal section through the coupling of my invention. The plane of section is indicated by the line 1—1 of Figure 2.

Figure 2 is a transverse sectional view of the coupling showing particularly the construction of the wedge and dog actuating mechanism. The plane of section is indicated by the line 2—2 of Figure 1.

In terms of broad inclusion the coupling embodying my invention includes an improved dog actuating mechanism for the coupling disclosed in my copending application Serial No. 451,953 filed May 13, 1930. In the improved form shown herein, means are provided for positively actuating the dogs in both directions. The various portions of the coupling subjected to the greatest wear are formed separately; and are detachably fixed on the main body of the coupling so that they may be replaced as occasion demands.

In terms of greater detail the coupling embodying my invention comprises a pair of cylindrical frames 3 and 4, having an external diameter permitting them to be loosely inserted in the pipe sections 6 and 7, which are to be temporarily joined; for example for a journey through a pipe wrapping or similar machine. Suitable radially extending sockets 8 are disposed, preferably at equal intervals, about the peripheral portions of the frames.

Inserted in these sockets are the dogs 9, having serrated or toothed faces 11 disposed to engage the interior surfaces of the pipe sections. The dogs are actuated, preferably in a radial direction, through the medium of the shanks 12, preferably formed integrally with the dogs, and having the inclined grooves 13, and head 14 formed on their outer ends for engagement with inclined ways comprising the companion grooves and flanges formed in a wedge block 16 which is movably mounted in the center of the frame. When the wedge 16 is moved longitudinally in the frame, the dogs will be forced in or out by the interaction of the inclined engaging surfaces.

To provide such longitudinal motion for the wedge, it is threaded on a spindle 19, journaled at one end in an end plate 21, and at the other end in a supporting boss 22.

The end plate 21 is removably held on the frame by suitable screws 25, in order that the interior of the coupling shall be accessible for assembly and repair.

The boss 22, in frame 4, is supported by an end diaphragm 23 reinforced by the arms 24; while the boss 22 in frame 3 is supported by the arms 24 alone.

An enlarged head 26 is formed on one end of the spindle 19 to provide a socket 27, adapted to receive a suitable wrench, and also to provide the shoulders 28 which restrain the spindle in an axial direction. The spindle is restrained further at its other end by a nut 29 threaded on the spindle and held in place by a pin 31. A hardened washer 32 is interposed between the nut and the boss to provide a bearing surface between those two members.

Frames 3 and 4 are coupled together by the tapered threads 33. The external thread is formed on a conical plug 34 attached to the diaphragm 23 by the bolts 36; and the internal thread is cut in a ring 37 formed inside the frame 3. Plug 34 could be formed integrally with frame 4, but I prefer to employ a separate plug because such construction permits the use of different materials in the two parts of the threaded joint, which decreases the sliding friction between them; and also permits the plug to be replaced after the threads become worn in use. The apertures 35 are provided in the arms 24 to give access to the bolts 36.

In order to better resist the shock and abrasion incident to continued use, the continuous faces of the two frames are preferably armoured with a tougher material than is used in the frames. Accordingly frame 4 is protected by a ring 38, held in place by the screws 39; and frame 3 is protected by a flanged sleeve 41, which is preferably shrunk on. In addition to protecting the faces, the members 38 and 41 provide flanges to engage the pipe ends and aid in aligning and holding the coupling parts while they are being attached to the pipe sections.

As previously mentioned this coupling is used primarily to join successive lengths, or sections of pipe during their journey through a wrapping or similar machine. When employed in such service an operator inserts a frame in the end of a pipe section, and dogs it in place by turning the spindle 19 with a suitable tool such as a brace plug wrench. It will be noted that as the operator presses the wrench into the socket the coupling will be approximately aligned by the flange pressing against the end of the pipe.

The section of pipe being rotated in the machine has a coupling in its trailing end. A succeeding section of pipe equipped with a suitable companion flange in its leading end is brought into a position that will permit the threads in the companion couplings to engage. The succeeding section need only be held lightly to prevent its rotation as the rotation of the section in the machine serves to run the coupling threads together. Similarly after a section of pipe has passed through a wrapping machine the wrapping is first severed at the joint and then the wrapped section is unscrewed by preventing its rotation which causes the rotation of the section in the machine to unscrew the coupling threads. In order not to interfere with subsequent operations it is then desirable that the couplings be removed quickly from the wrapped section.

It sometimes happens that the teeth on the dog faces will hog into the pipe and thus hold the couplings rather securely in place; but by having the movement of the dogs positively actuated inwardly as well as outwardly the dogs can always be broken free and the couplings quickly removed.

I claim:

1. In a coupling for temporarily connecting a pair of pipe sections, frames adapted for mounting on the ends of said sections, dogs on said frames, a wedge movably mounted on each frame, means for positively connecting the dogs and wedges, means for actuating the wedge to move the dogs into locking engagement with the pipe sections, and interengaging means operable to connect the frames for coupling the pipe sections together.

2. In a coupling for temporarily connecting a pair of pipe sections, frames adapted for insertion in the ends of said sections, dogs on said frames, a wedge movably mounted on each frame, means for positively connecting the dogs and wedges, means for actuating the wedges to move the dogs into locking engagement with the pipe sections, and interengaging means operable to connect the frames for coupling the pipe sections together.

3. In a coupling for temporarily connecting a pair of pipe sections, frames adapted for mounting on the ends of said sections, dogs on said frames, a wedge movably mounted on each frame, means for positively connecting the dogs and wedges, and screw means for actuating the wedges to move the dogs into locking engagement with the pipe sections, and interengaging means operable to connect the frames for coupling the pipe sections together.

4. In a coupling for temporarily connecting a pair of pipe sections, frames adapted for mounting on the ends of said sections, dogs on said frames, an axially movable wedge mounted on each frame, means for positively connecting the dogs and wedges, means for actuating the wedges to move the dogs into locking engagement with the pipe sections, and interengaging means operable to connect the frames for coupling the pipe sections together.

5. In a coupling for temporarily connecting a pair of pipe sections, frames adapted for mounting on the ends of said sections, dogs on said frames, an axially movable wedge mounted on each frame, means on the wedges for positively connecting the dogs thereto, a spindle threaded into each wedge for actuating the same to move the dogs into locking engagement with the pipe sections, and interengaging means operable to connect the frames for coupling the pipe sections together.

6. In a coupling for temporarily connecting a pair of pipe sections, frames adapted for insertion in the ends of said sections, dogs having inwardly extending shanks and mounted for radial movement in said frames, a wedge having inclined flanged ways thereon and mounted for axial movement in each of said frames, heads on the shanks engaging the flanged ways on the wedges, means for actuating the wedges to move the dogs into locking engagement with the pipe sections, and interengaging means operable to connect the frames for coupling the pipe sections together.

7. In a coupling for temporarily connecting a pair of pipe sections, hollow cylindrical frames adapted for insertion in the ends of said sections, radially extending dogs movably mounted on said frames, a movably mounted wedge disposed within each frame, means for positively connecting the dogs and wedges, means arranged within each frame for actuating the wedges to move the dogs into locking engagement with the pipe sections, and interengaging means operable to connect the frames for coupling the pipe sections together.

In testimony whereof, I have hereunto set my hand.

LELAND S. ROSENER.